United States Patent
Abe et al.

(10) Patent No.: US 10,148,965 B2
(45) Date of Patent: Dec. 4, 2018

(54) MOVING IMAGE CODING APPARATUS AND MOVING IMAGE CODING METHOD

(71) Applicant: Panasonic Intellectual Property Management Co., Ltd., Osaka (JP)

(72) Inventors: Kiyofumi Abe, Osaka (JP); Hideyuki Ohgose, Osaka (JP); Hiroshi Arakawa, Tokyo (JP); Koji Arimura, Osaka (JP); Kazuma Sakakibara, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 309 days.

(21) Appl. No.: 15/058,691

(22) Filed: Mar. 2, 2016

(65) Prior Publication Data
US 2016/0261873 A1  Sep. 8, 2016

(30) Foreign Application Priority Data

Mar. 4, 2015 (JP) .................................. 2015-042934
Jan. 21, 2016 (JP) .................................. 2016-009713

(51) Int. Cl.
*H04N 19/105* (2014.01)
*H04N 19/159* (2014.01)
(Continued)

(52) U.S. Cl.
CPC ......... *H04N 19/172* (2014.11); *H04N 19/105* (2014.11); *H04N 19/159* (2014.11); *H04N 19/423* (2014.11)

(58) Field of Classification Search
None
See application file for complete search history.

(56) References Cited

U.S. PATENT DOCUMENTS

2004/0136461 A1* 7/2004 Kondo ................. H04N 19/105
375/240.16
2004/0146109 A1* 7/2004 Kondo ................. H04N 19/105
375/240.16
(Continued)

FOREIGN PATENT DOCUMENTS

JP   2008-219204 A   9/2008

OTHER PUBLICATIONS

"Recommendation ITU-T H.265: High efficiency video coding", Telecommunication Standardization Sector of ITU, International Telecommunication Union, Apr. 2013, 317 pages.

*Primary Examiner* — Kate H Luo
(74) *Attorney, Agent, or Firm* — Wenderoth, Lind & Ponack, L.L.P.

(57) ABSTRACT

A moving image coding apparatus is a moving image coding apparatus which codes a moving image, and includes a storage unit in which a plurality of reference pictures is stored; and a coding unit which codes a plurality of coding target pictures. The coding unit codes as a B picture a specific coding target picture among the plurality of coding target pictures by using a first reference picture list and a second reference picture list. The first reference picture list includes only one long-term reference picture ahead of the specific coding target picture among the plurality of reference pictures in a display order. The second reference picture list includes only one short-term reference picture ahead of the specific coding target picture among the plurality of reference pictures in the display order.

13 Claims, 5 Drawing Sheets

(51) Int. Cl.
*H04N 19/172* (2014.01)
*H04N 19/423* (2014.01)

(56) References Cited

U.S. PATENT DOCUMENTS

| | | | |
|---|---|---|---|
| 2005/0105809 A1* | 5/2005 | Abe | H04N 19/105 |
| | | | 382/236 |
| 2008/0232467 A1* | 9/2008 | Iguchi | H04N 5/85 |
| | | | 375/240.12 |
| 2009/0168886 A1* | 7/2009 | Ikeda | H04N 19/105 |
| | | | 375/240.16 |
| 2009/0323824 A1* | 12/2009 | Pandit | H04N 21/2365 |
| | | | 375/240.26 |
| 2010/0118944 A1 | 5/2010 | Tanaka et al. | |

* cited by examiner

MOVING IMAGE CODING APPARATUS AND MOVING IMAGE CODING METHOD

RELATED APPLICATIONS

This application is based upon and claims the benefit of priority to Japanese Patent Application No. 2015-042934, filed on Mar. 4, 2015, and Japanese Patent Application No. 2016-009713, filed on Jan. 21, 2016, which are incorporated herein by reference in their entirety.

BACKGROUND

1. Technical Field

The present disclosure relates to a moving image coding apparatus and a moving image coding method which code moving images.

2. Description of the Related Art

Unexamined Japanese Patent Publication No. 2008-219204 discloses an image information coding apparatus which outputs image compression information based on an AVC (Advanced Video Coding) coding mode.

When performing multiple frame prediction, this image information coding apparatus registers as a long-period reference picture a reference B picture (Bidirectionally predictive-coded Picture) between two pictures of P picture (Predictive-coded Picture) and I picture (Intra-coded Picture) by using a memory management control command for managing a picture in a decoded image buffer.

Further, this image information coding apparatus places the reference B picture at a top of a reference picture list by using a reference picture list order command, in a B picture between the P picture or the I picture and the reference B picture. Furthermore, this image information coding apparatus sets to [0] a maximum value of a long-period frame index in the P picture or the I picture according to the memory management control command.

Consequently, this image information coding apparatus sets the long-period reference picture in the decoded image buffer to a non-reference picture, and can make a random access from the I picture which is not an IDR (Instantaneous Decoder Refresh) picture.

SUMMARY

The present disclosure provides a moving image coding apparatus and a moving image coding method which can efficiently code a coding target picture by referring to a long-term reference picture.

A moving image coding apparatus according to the present disclosure is a moving image coding apparatus which codes a moving image, and includes a storage unit in which a plurality of reference pictures is stored; and a coding unit which codes a plurality of coding target pictures. The coding unit codes, as a B picture, a specific coding target picture among the plurality of coding target pictures by using a first reference picture list and a second reference picture list. The first reference picture list includes only one long-term reference picture ahead of the specific coding target picture among the plurality of reference pictures in a display order. The second reference picture list includes only one short-term reference picture ahead of the specific coding target picture among the plurality of reference pictures in the display order.

The moving image coding apparatus according to the present disclosure can efficiently code a coding target picture by referring to a long-term reference picture.

DETAILED DESCRIPTION

Exemplary embodiments will be described in detail optionally with reference to the drawings. However, descriptions detailed more than necessary may be omitted. For example, matters which have already been well known will not be described in detail, and substantially same components will not be described again in some cases to prevent the following descriptions from becoming redundant more than necessary and to help one of ordinary skill in the art understand the exemplary embodiments.

In addition, the inventor of the present disclosure provides the accompanying drawings and the following description to help one of ordinary skill in the art sufficiently understand the present disclosure yet do not intend to limit a subject matter recited in the claims.

Further, in the following descriptions, ordinal numbers such as first, second and third may be optionally replaced, omitted or newly allocated.

First Exemplary Embodiment

The first exemplary embodiment will be described below with reference to FIGS. 1 to 6.

[1-1. Configuration]

Figure 1:
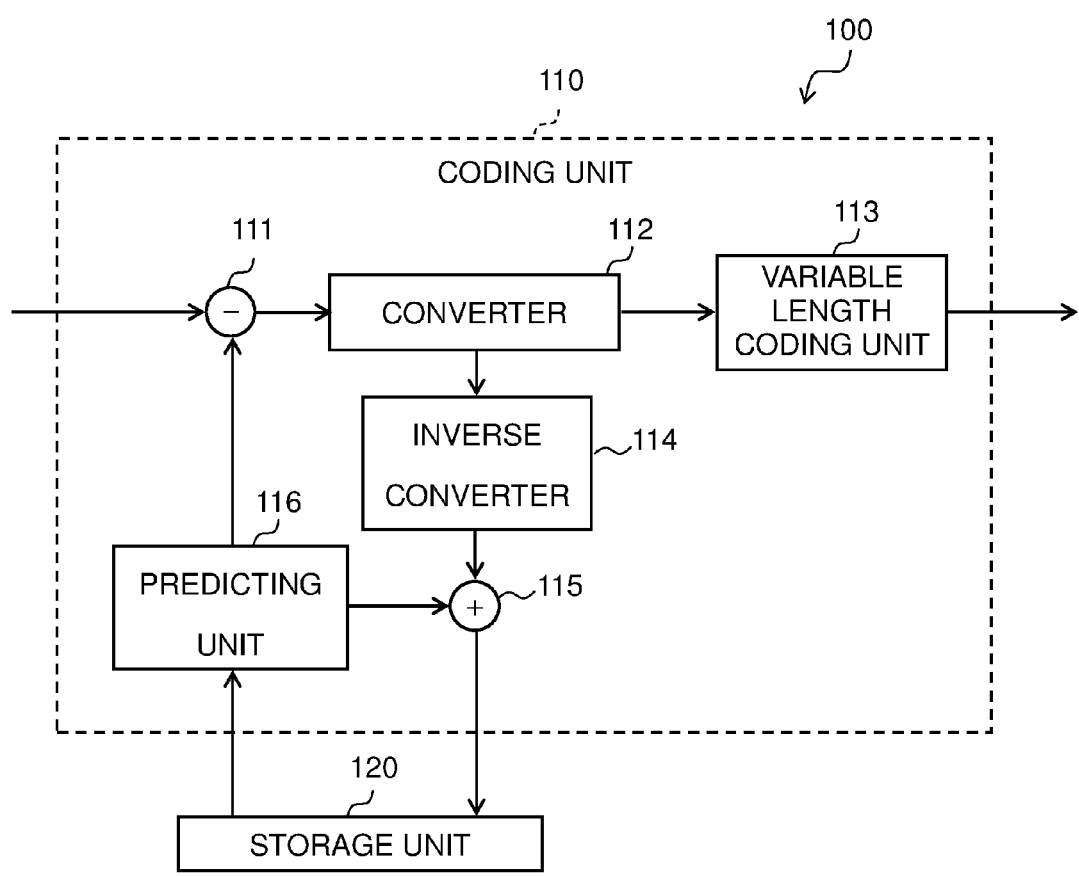
FIG. 1 is a block diagram illustrating a configuration of a moving image coding apparatus according to a first exemplary embodiment.

FIG. 1 is a block diagram illustrating a configuration of a moving image coding apparatus according to the first exemplary embodiment. Moving image coding apparatus 100 illustrated in FIG. 1 includes coding unit 110 and storage unit 120. Coding unit 110 includes subtractor 111, converter 112, variable length coding unit 113, inverse converter 114, adder 115 and predicting unit 116.

Moving image coding apparatus 100 codes a moving image. More specifically, in moving image coding apparatus 100, coding unit 110 codes a plurality of pictures included in each moving image according to, for example, a predetermined moving image coding standard called AVC or HEVC. More specifically, coding unit 110 codes pictures to be coded, i.e., coding target pictures per block.

When coding unit 110 codes the coding target pictures per block, predicting unit 116 generates a prediction image block for an original image block in each coding target picture by in-plane prediction or inter-plane prediction. Subtractor 111 generates a difference image block by subtracting the prediction image block from the original image block in each coding target picture. Converter 112 generates a coefficient block by converting the difference image block into a frequency component and quantizing the frequency component.

Variable length coding unit 113 generates a coding block by performing variable length coding on the coefficient block. Inverse converter 114 generates a difference image block by inversely quantizing the coefficient block and converting the coefficient block into an image component. Adder 115 generates a reconfiguration image block by adding the prediction image block to the difference image block. Filtering processing of reducing block distortion may be applied to the reconfiguration image block.

Coding unit 110 generates a reconfiguration picture generated for each coding target picture and including a plurality of reconfiguration image blocks, and stores in storage unit 120 the reconfiguration picture as a reference picture used for inter-plane prediction. When, for example, a next coding target picture is coded, predicting unit 116 generates a prediction image block for an original image block in the next coding target picture by referring to a reference picture stored in storage unit 120, and performing inter-plane prediction.

Further, each of a plurality of pictures included in a moving image is classified into any of an I picture, a P picture and a B picture. Each I picture, each P picture and each B picture are also referred to as picture types.

In each I picture, performing inter-plane prediction for each block is prohibited. In each P picture, performing inter-plane prediction for each block is allowed, and referring to one reference picture per one block is enabled. In each B picture performing inter-plane prediction for each block is allowed, and referring to two reference pictures per one block at maximum is enabled.

More specifically, when the coding target picture is an I picture, coding unit 110 codes each coding target picture by performing in-plane prediction on each block of each coding target picture. When the coding target picture is a P picture, coding unit 110 codes each coding target picture by using one reference picture list per coding target picture. When the coding target picture is a B picture, coding unit 110 codes each coding target picture by using two reference picture lists per coding target picture.

In addition, in the present disclosure, a meaning of a term, B picture, is the same as a meaning of the B picture defined according to a predetermined moving image coding standard such as AVC or HEVC (High Efficiency Video Coding).

Hence, when a B picture is simply described in the present disclosure, a reference destination direction is not limited to two different directions of a forward direction and a backward direction in a display order. That is, a word, bidirectionally, is used for the term, B picture (Bidirectionally predictive-coded Picture). However, this word, bidirectionally, by no means limits the reference destination to two different directions of the forward direction and the backward direction, and may be two directions of a forward direction and a forward direction and two directions of a backward direction and a backward direction. Hence, when it is necessary to clarify a reference destination direction to describe a B picture, not only the B picture is simply expressed but also the reference destination direction is mentioned separately.

Each reference picture list includes one or more reference pictures. The reference picture list is referred to as a reference list in some cases. When, for example, a coding target picture is a P picture, coding unit 110 may select a reference picture to which a reference is made upon inter-plane prediction, per block from a plurality of reference pictures included in one reference picture list.

Further, when a coding target picture is a B picture, coding unit 110 may select a reference picture to which a reference is made upon inter-plane prediction, per block from a plurality of reference pictures included in two reference picture lists. Furthermore, in this case, coding unit 110 may select two reference pictures in total by selecting one reference picture from each of the two reference picture lists per block. For example, coding unit 110 may perform bidirectional prediction by referring to two reference pictures per block.

The two reference picture lists are referred to as L0 and L1. When, for example, a coding target picture is a P picture, only one reference picture list L0 among two reference picture lists L0 and L1 is used. Further, when a coding target picture is a B picture, two reference picture lists L0 and L1 are used.

Storage unit 120 stores a plurality of reference pictures. Each reference picture stored in storage unit 120 is a picture used for inter-plane prediction, and is a reconfiguration picture for a coded picture. When coding unit 110 codes an original image block in a coding target picture by using inter-plane prediction, predicting unit 116 generates a prediction image block by referring to a reference picture and predicting an original image block.

Moving image coding apparatus 100 classifies each of a plurality of reference pictures into one of long-term reference pictures and short-term reference pictures. Each long-term reference picture is also referred to as a long-period reference picture or a long-term picture. Each short-term reference picture is also referred to as a short-period reference picture or a short-term picture. Each long-term reference picture and each short-term reference picture are reference pictures generated according to, for example, a predetermined moving image coding standard called AVC or HEVC.

Each long-term reference picture is a reference picture used to be maintained longer in storage unit 120 than each short-term reference picture.

For example, each long-term reference picture is maintained in storage unit 120 until an explicit command is received. Meanwhile, each short-term reference picture is deleted from storage unit 120 without waiting for an explicit command after a predetermined period of time passes.

Figure 2:
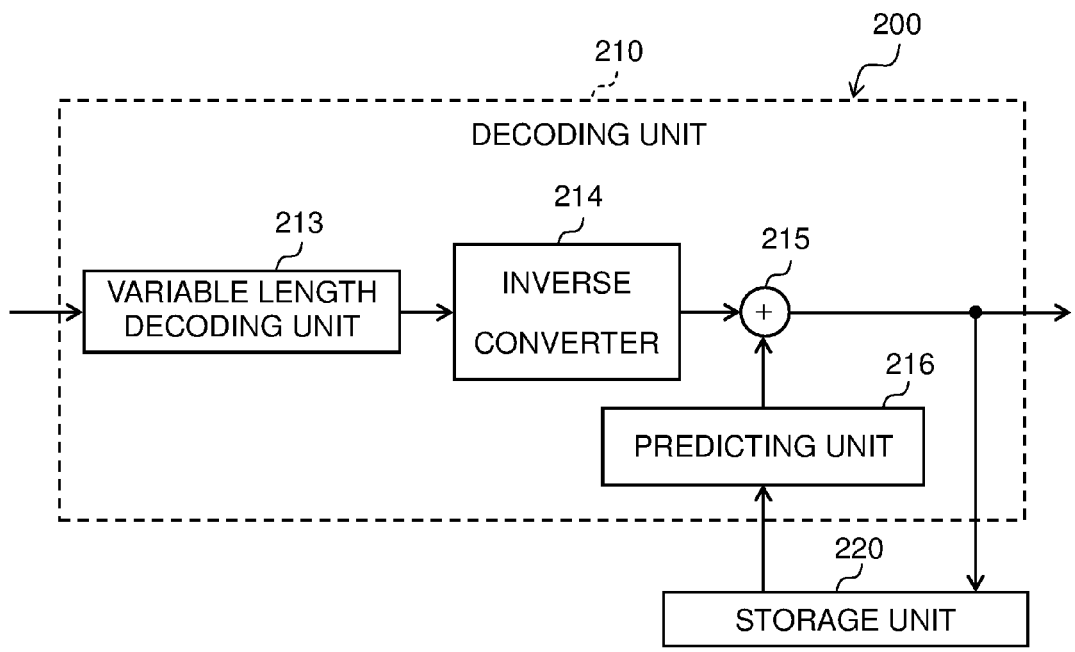
FIG. 2 is a block diagram illustrating a configuration of a moving image decoding apparatus according to the first exemplary embodiment.

FIG. 2 is a block diagram illustrating a configuration of a moving image decoding apparatus which corresponds to moving image coding apparatus 100 illustrated in FIG. 1. Moving image decoding apparatus 200 illustrated in FIG. 2 includes decoding unit 210 and storage unit 220. Decoding unit 210 includes variable length decoding unit 213, inverse converter 214, adder 215 and predicting unit 216.

Moving image decoding apparatus 200 decodes a moving image. More specifically, in moving image decoding apparatus 200, decoding unit 210 decodes a plurality of pictures included in each moving image according to, for example, a predetermined moving image coding standard called AVC or HEVC. More specifically, decoding unit 210 decodes pictures to be decoded, i.e., decoding target pictures per block.

When decoding unit 210 decodes each decoding target picture per block, variable length decoding unit 213 generates a coefficient block by performing variable length decoding on a coded block. Inverse converter 214 generates a difference image block by inversely quantizing the coefficient block and converting the coefficient block into an image component.

Predicting unit 216 generates a prediction image block by in-plane prediction or inter-plane prediction. Adder 215 generates a reconfiguration image block by adding the prediction image block to the difference image block. Filtering processing of reducing block distortion may be applied to the reconfiguration image block.

Decoding unit 210 generates a reconfiguration picture generated for each decoding target picture and including a plurality of reconfiguration image blocks, and outputs the reconfiguration picture as a decoded picture.

Further, decoding unit 210 stores in storage unit 220 the reconfiguration picture as a reference picture used for inter-plane prediction. When, for example, a next decoding target picture is decoded, predicting unit 216 generates a prediction image block for a decoding target image block in a next decoding target picture by referring to a reference picture stored in storage unit 220, and performing inter-plane prediction.

Storage unit 220 stores a plurality of reference pictures similar to storage unit 120 of moving image coding apparatus 100. Each reference picture stored in storage unit 220 is a picture used for inter-plane prediction, and is a reconfiguration picture equivalent to a decoded picture. When decoding unit 210 decodes a decoding target image block in a decoding target picture by using inter-plane prediction, predicting unit 216 generates a prediction image block by using a reference picture and predicting the decoding target image block.

Moving image decoding apparatus 200 classifies each of a plurality of reference pictures into one of long-term reference pictures and short-term reference pictures similar to moving image coding apparatus 100. Each long-term reference picture is a reference picture used to be maintained longer in storage unit 220 than each short-term reference picture. For example, each long-term reference picture is maintained in storage unit 220 until an explicit command is received. Meanwhile, each short-term reference picture is deleted from storage unit 220 without waiting for an explicit command after a predetermined period of time passes.

Coding unit 110 of moving image coding apparatus 100 may code a command for deleting a reference picture from storage unit 220. Further, decoding unit 210 of moving image decoding apparatus 200 may decode a coded command, and execute the decoded command. Consequently, moving image coding apparatus 100 can control deletion of reference pictures in moving image decoding apparatus 200. That is, moving image coding apparatus 100 can match a state of storage unit 120 and a state of storage unit 220.

[1-2. Operation]

An operation of moving image coding apparatus 100 configured as described above will be described below. First, ways to use of long-term reference pictures and short-term reference pictures in moving image coding apparatus 100 will be described. In addition, the operation of moving image coding apparatus 100 will be basically described below. Moving image decoding apparatus 200 performs an operation which corresponds to the operation of moving image coding apparatus 100. Further, coding or decoding a picture by referring to another picture may be expressed that a picture refers to another picture, in some cases.

As described above, each long-term reference picture is stored longer in storage unit 120 than each short-term reference picture. Accordingly, more pictures refer to each long-term reference picture as a reference picture than each short-term reference picture. Hence, moving image coding apparatus 100 generates, as a long-term reference picture, a higher quality reference picture than a short-term reference picture.

More specifically, coding unit 110 codes each long-term reference picture with a larger amount of code than an amount of code of each short-term reference picture. Consequently, a high quality long-term reference picture is generated.

Further, a temporal distance between a coding target picture and a long-term reference picture is longer than a temporal distance between the coding target picture and a short-term reference picture. Hence, moving image coding apparatus 100 switches a reference destination between each long-term reference picture and each short-term reference picture per block of each coding target picture.

Figure 3:
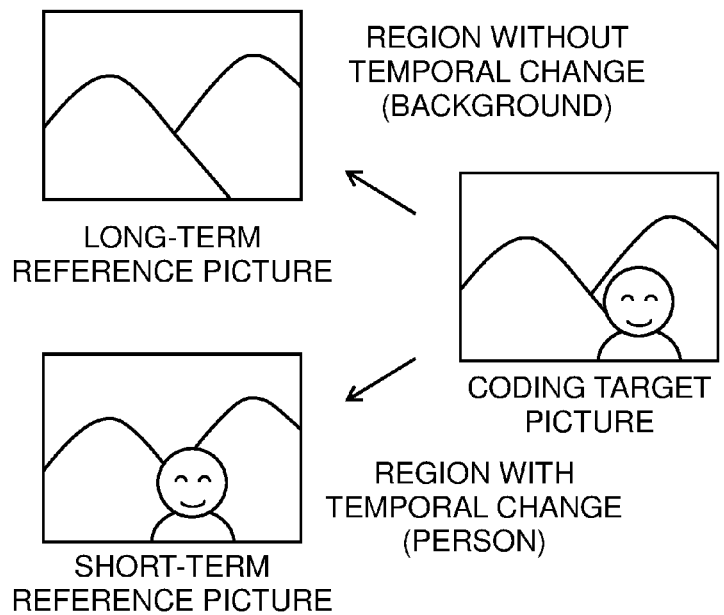
FIG. 3 is a conceptual diagram illustrating a reference mode performed for inter-plane prediction by the moving image coding apparatus according to the first exemplary embodiment.

FIG. 3 is a conceptual diagram illustrating a reference mode performed for inter-plane prediction by moving image coding apparatus 100 illustrated in FIG. 1. More specifically, as illustrated in FIG. 3, coding unit 110 refers to a high quality long-term reference picture when coding a block in a region such as a background without a temporal change. Meanwhile, coding unit 110 refers to a short-term reference picture when coding a block in a region such as a person with a temporal change. Consequently, coding unit 110 can code a coding target picture by referring to, for example, both of a high quality background image and a person image with a motion. Consequently, it is possible to efficiently code the coding target picture.

Figure 4:
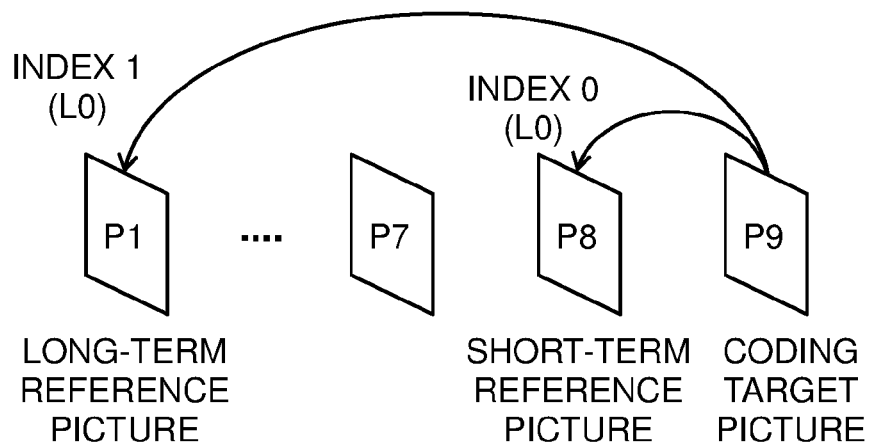
FIG. 4 is a conceptual diagram illustrating a reference relationship between a coding target picture and a reference picture in a reference example.

FIG. 4 is a conceptual diagram illustrating a reference relationship between a coding target picture and a reference picture in a reference example. FIG. 4 illustrates picture P1, . . . , picture P7, picture P8 and picture P9 in a display order (input order).

In addition, a coding order is the same as the display order in the present exemplary embodiment. However, the coding order is not limited to the same order as the display order, and the coding order may be different from the display order. Further, FIG. 4 exemplifies the reference example for describing a conventional problem found by the inventor of the present disclosure. That is, FIG. 4 is not a view illustrating a fundamental feature of moving image coding apparatus 100 according to the present disclosure.

FIG. 4 illustrates that picture P1 is a long-term reference picture and picture P8 is a short-term reference picture. Picture P9 is a coding target picture. Moving image coding apparatus 100 switches a reference destination between picture P1 and picture P8 per block, and codes picture P9.

When, for example, picture P9 is coded as a P picture, one reference picture list L0 is used. In this case, reference picture list L0 includes picture P1 and picture P8. Further, index 1 is allocated to picture P1 and index 0 is allocated to picture P8 to identify picture P1 and picture P8.

In this case, for a processing target picture, moving image coding apparatus 100 codes information indicating a reference picture included in reference picture list L0.

For the processing target picture, moving image decoding apparatus 200 can decode the coded information, and use same reference picture list L0 as reference picture list L0 used by moving image coding apparatus 100. The same index as an index allocated to the reference picture of reference picture list L0 of moving image coding apparatus 100 is allocated to the reference picture of reference picture list L0 of moving image decoding apparatus 200.

Further, for the processing target block, moving image coding apparatus 100 codes reference picture index information for identifying whether a reference picture (picture P1 in FIG. 4) to which index 1 has been allocated is selected or a reference picture (picture P8 in FIG. 4) to which index 0 has been allocated is selected. For the processing target picture, moving image decoding apparatus 200 can decode the coded reference picture index information, and select the same reference picture as the reference picture selected by moving image coding apparatus 100.

However, as described above, moving image coding apparatus 100 needs to code reference picture index information for a processing target block at all times. Hence, when moving image coding apparatus 100 codes a coding target picture by switching a reference destination per block, an amount of code is likely to increase.

Further, it is necessary to perform processing of controlling allocation of a plurality of reference pictures to one reference picture list, and perform processing of controlling selection of one reference picture from the plurality of reference pictures per processing target block. Hence, a control circuit is likely to become complicated.

Hence, moving image coding apparatus 100 is configured to be capable of allocating index 0 to both of two reference pictures which are switched and referred to. When index 0 is allocated to both of the two reference pictures, moving image coding apparatus 100 codes a coding target picture as a B picture. More specifically, a reference relationship illustrated in FIG. 4 is improved to a reference relationship illustrated in FIG. 5.

Figure 5:
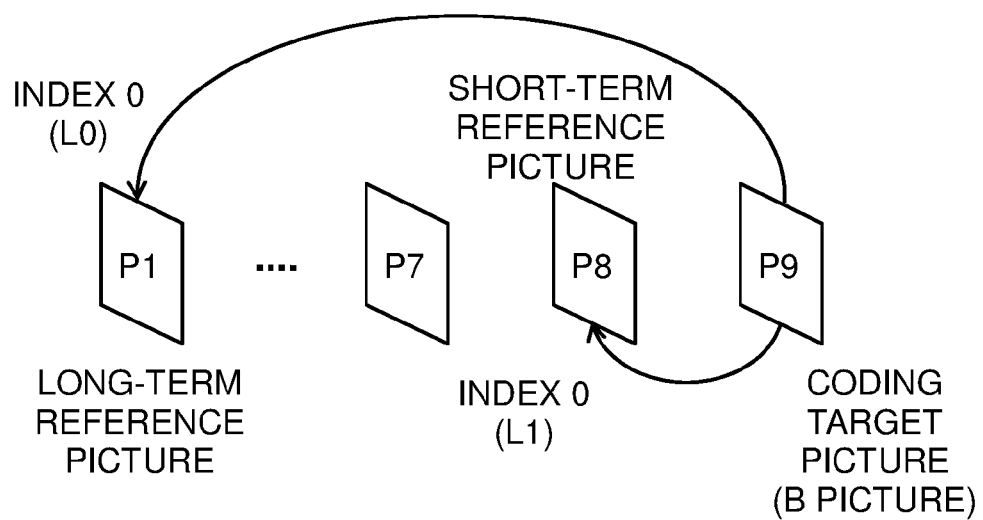
FIG. 5 is a conceptual diagram illustrating a reference relationship between a coding target picture and a reference picture according to the first exemplary embodiment.

FIG. 5 is a conceptual diagram illustrating a reference relationship between a coding target picture and a reference picture of moving image coding apparatus 100 illustrated in FIG. 1. Similar to FIG. 4, FIG. 5 illustrates picture P1, . . . , picture P7, picture P8 and picture P9. Moving image coding apparatus 100 switches a reference destination between picture P1 and picture P8 per block, and codes picture P9.

As described above, moving image coding apparatus 100 codes a coding target picture as a B picture. Reference picture list L0 and reference picture list L1 are used to code a B picture. For example, moving image coding apparatus 100 allocates index 0 of reference picture list L0 to picture P1, and allocates index 0 of reference picture list L1 to picture P8. Thus, index 0 is allocated to both of two pictures P1 and P8. That is, only index 0 is allocated to all reference pictures.

For example, for a processing target picture, moving image coding apparatus 100 codes information indicating the reference picture included in reference picture list L0, and information indicating a reference picture included in reference picture list L1.

For the processing target picture, moving image decoding apparatus 200 can decode the pieces of coded information, and use same reference picture lists L0 and L1 as reference picture lists L0 and L1 used by moving image coding apparatus 100. Only index 0 is allocated to the reference pictures of reference picture lists L0 and L1 of moving image decoding apparatus 200 in the same way that the indices are allocated to the reference pictures of reference picture lists L0 and L1 of moving image coding apparatus 100.

Further, for the processing target block, moving image coding apparatus 100 can switch between and refer to the reference picture of reference picture list L0 (picture P1 in FIG. 5) to which index 0 has been allocated, and the reference picture of reference picture list L1 (picture P8 in FIG. 5) to which index 0 has been allocated without coding the reference picture index information. For the processing target block, moving image decoding apparatus 200 can select the same reference picture as the reference picture selected by moving image coding apparatus 100 without decoding the reference picture index information.

In case of the reference relationship illustrated in FIG. 5, an amount of code does not change when a reference is made to reference picture list L0 and when a reference is made to reference picture list L1. This is because index 0 is allocated not only to picture P1 of reference picture list L0 but also picture P8 of reference picture list L1.

Meanwhile, in case of the reference relationship illustrated in FIG. 4, index 0 is allocated to picture P8 of reference picture list L0, and index 1 is allocated to picture P1 of reference picture list L0. Hence, index 1 needs to be coded, and therefore this amount of code increases an amount of code compared to the reference relationship illustrated in FIG. 5.

Hence, moving image coding apparatus 100 can switch between and refer to picture P1 and picture P8 per block while suppressing an increase in the amount of code when coding picture P9.

Further, only one reference picture is allocated to one reference picture list, so that processing of controlling allocation of reference pictures and processing of controlling selection of a reference picture per processing target block are simplified. Consequently, it is possible to simplify a configuration of a control circuit. Such an effect becomes remarkable particularly when the reference relationship illustrated in FIG. 5 is applied to a moving image coding apparatus which performs coding according to a moving image coding standard (e.g. HEVC) whose coding information management is complicated.

Conventionally, there is a moving image coding apparatus which is configured to be capable of coding a coding target picture as a B picture. Moving image coding apparatus 100 according to the present exemplary embodiment can be realized by applying the reference relationship illustrated in FIG. 5 to a conventional moving image coding apparatus. To realize moving image coding apparatus 100, it is necessary to replace processing of coding B pictures in the conventional moving image coding apparatus, with processing of coding B pictures in moving image coding apparatus 100. That is, it is only necessary to simply make a design change from a conventional technique to a technique according to the present exemplary embodiment by replacing processing of controlling allocation of reference pictures and processing of controlling selection of reference pictures per processing target block when a coding target picture is coded as a B picture. Consequently, it is possible to realize moving image coding apparatus 100 according to the present exemplary embodiment without making an apparatus structure complicated.

In addition, in the example in FIG. 5, a long-term reference picture is included in reference picture list L0, and a short-term reference picture is included in reference picture list L1. However, the long-term reference picture may be included in reference picture list L1 and the short-term reference picture may be included in reference picture list L0, i.e., L0 and L1 may be reversed.

Further, in the above description, when the reference picture to which index 0 has been allocated is selected, an index is not coded. That is, index 0 is not coded. However, it is possible to obtain the same effect in a case where an amount of code of index 0 is smaller than an amount of code of index 1 not only when index 0 is not coded but also when index 0 is coded.

Moving image coding apparatus 100 codes a specific coding target picture as a B picture by using a first reference picture list including only one long-term reference picture and a second reference picture list including only one short-term reference picture. Meanwhile, moving image coding apparatus 100 does not need to code all coding target pictures as specific coding target pictures as described above. That is, at least one of the coding target pictures coded by moving image coding apparatus 100 needs to be coded as a specific coding target picture. In this case, the coding target pictures other than the specific coding target picture may be coded as P pictures or I pictures or may be coded as B pictures according to another reference relationship.

Figure 6:
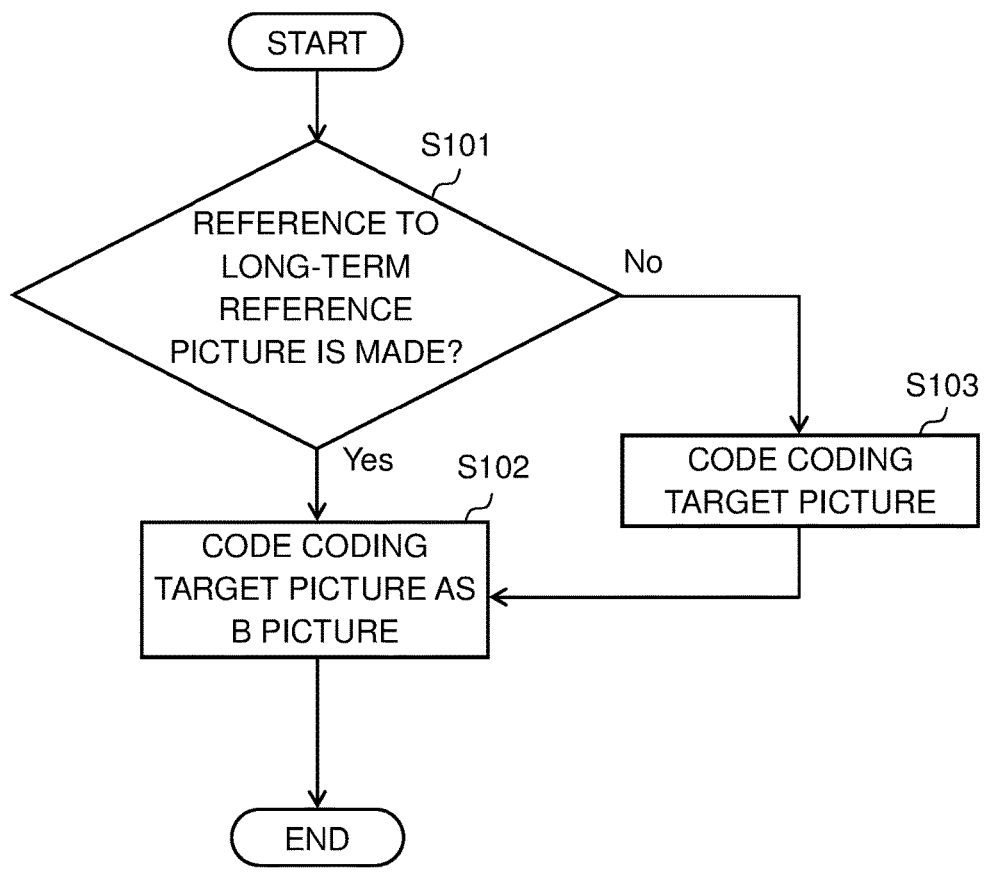
FIG. 6 is a flowchart illustrating an operation of the moving image coding apparatus according to the first exemplary embodiment.

FIG. 6 is a flowchart illustrating an operation of moving image coding apparatus 100 illustrated in FIG. 1. When, for example, switching one reference picture to which a reference is made, between two reference pictures per block and coding each coding target picture, moving image coding apparatus 100 codes each coding target picture as a B picture instead of a P picture. A specific operation of moving image coding apparatus 100 will be described below.

First, coding unit 110 determines whether or not to refer to a long-term reference picture to code a coding target picture (S101).

When referring to the long-term reference picture to code the coding target picture (Yes in S101), coding unit 110 codes the coding target picture as a B picture by using two reference picture lists (S102). Only one long-term reference picture is included in one of these two reference picture lists, and only one short-term reference picture is included in the other one.

Thus, index 0 is allocated to both of two reference pictures. Thus, an increase in an amount of code is suppressed. Further, by, for example, switching a reference picture to which a reference is made per block between a temporarily distant long-term reference picture and a temporarily close short-term reference picture, coding unit 110 can code the coding target picture. Consequently, coding unit 110 can adequately code the coding target picture.

Meanwhile, when a reference to the long-term reference picture is not made to code the coding target picture (No in S101), coding unit 110 codes the coding target picture as usual (S103). In this case, a method for coding each coding target picture is not limited. For example, coding unit 110 may code a coding target picture as a P picture by using one reference picture list, or may code a coding target picture as an I picture without using a reference picture.

Alternatively, coding unit 110 may code a coding target picture as a B picture when it is possible to refer to a last reference picture and a reference picture ahead of the last reference picture. In this case, the last reference picture may be included as a short-term reference picture in one reference picture list, or the reference picture ahead of the last reference picture may be included as a long-term reference picture in the other reference picture list.

Further, whether or not a reference is made in S101 may be determined based on whether or not a reference picture is stored in storage unit 120. That is, when a long-term reference picture is not stored in storage unit 120, a coding target picture may be coded as a P picture by using one reference picture list or may be coded as an I picture without using a reference picture.

[1-3. Effect and Others]

As described above, in the present exemplary embodiment, moving image coding apparatus 100 codes a moving image. Further, moving image coding apparatus 100 includes coding unit 110 and storage unit 120. Storage unit 120 stores a plurality of reference pictures. Coding unit 110 codes a plurality of coding target pictures. Coding unit 110 codes as a B picture a specific coding target picture among a plurality of coding target pictures by using a first reference picture list and a second reference picture list. The first reference picture list includes only one long-term reference picture ahead of the specific coding target picture among a plurality of reference pictures in the display order, and the second reference picture list includes only one short-term reference picture ahead of the specific coding target picture among a plurality of reference pictures in the display order. Thus, moving image coding apparatus 100 can switch between and refer to the long-term reference picture and the short-term reference picture per block while suppressing an increase in an amount of code when coding a coding target picture. That is, moving image coding apparatus 100 can efficiently code a coding target picture by referring to a long-term reference picture.

Moreover, the first reference picture list and the second reference picture list each include only one of the long-term reference picture and the short-term reference picture, so that it is possible to allocate index 0 to all reference pictures. Consequently, it is possible to switch between and refer to the long-term reference picture and the short-term reference picture per block while suppressing an increase in an amount of code.

Moreover, both of the reference pictures included in the first reference picture list and the second reference picture list are reference pictures ahead of a coding target picture in the display order. Consequently, it is possible to switch between and refer to the two reference pictures ahead of the coding target picture per block.

Further, in the present exemplary embodiment, one long-term reference picture included in the first reference picture list is a reference picture ahead of one short-term reference picture included in the second reference picture list in the display order.

Consequently, it is possible to switch a reference destination between a long-term reference picture whose temporal distance from a coding target picture is long, and a short-term reference picture whose temporal distance from the coding target picture is short.

Further, in the present exemplary embodiment, one short-term reference picture included in the second reference picture list is a last reference picture which comes immediately before a coding target picture in the display order.

Consequently, moving image coding apparatus 100 can refer to the last short-term reference picture for a region with a great motion in the coding target picture, for example. Consequently, moving image coding apparatus 100 can adequately code the coding target picture while suppressing an increase in an amount of code.

Further, in the present exemplary embodiment, coding unit 110 codes each long-term reference picture with a larger amount of code than an amount of code of each short-term reference picture.

Thus, each long-term reference picture having higher quality than each short-term reference picture is used. Consequently, moving image coding apparatus 100 can switch between and refer to a high quality long-term reference picture and a low quality short-term reference picture per block while suppressing an increase in an amount of code when coding a coding target picture.

Further, in the present exemplary embodiment, when a long-term reference picture is included in one or more pictures used for reference upon coding of a coding target picture, coding unit 110 codes the coding target picture as a B picture by using the first reference picture list and the second reference picture list.

Furthermore, in the present exemplary embodiment, when a long-term reference picture is not included in storage unit 120 upon coding a plurality of coding target pictures, coding unit 110 codes the coding target picture as a P picture by using only the second reference picture list or codes the coding target picture as an I picture without using the second reference picture.

Consequently, moving image coding apparatus 100 adequately can switch a picture type of a coding target picture when a long-term reference picture is not included upon coding of the coding target picture.

Further, in the present exemplary embodiment, coding unit 110 codes each of a plurality of blocks in a specific coding target picture by referring to only one of one long-term reference picture and one short-term reference picture.

Consequently, moving image coding apparatus 100 can switch between and refer to the long-term reference picture and the short-term reference picture per block when coding a coding target picture.

Further, in the present exemplary embodiment, moving image decoding apparatus 200 includes components which match the components of moving image coding apparatus 100, and performs an operation which corresponds to the operation of moving image coding apparatus 100. For example, moving image decoding apparatus 200 decodes a moving image. Further, moving image decoding apparatus 200 includes decoding unit 210 and storage unit 220. Storage unit 220 stores a plurality of reference pictures. Decoding unit 210 codes a plurality of coding target pictures.

Decoding unit 210 decodes as a B picture a specific coding target picture among a plurality of coding target pictures by using the first reference picture list and the second reference picture list. The first reference picture list includes only one long-term reference picture ahead of the specific coding target picture among a plurality of reference pictures in the display order, and the second reference picture list includes only one short-term reference picture ahead of the specific coding target picture among a plurality of reference pictures in the display order.

Consequently, moving image decoding apparatus 200 can switch between and refer to the long-term reference picture and the short-term reference picture per block similar to moving image coding apparatus 100 when decoding a decoding target picture. That is, moving image decoding apparatus 200 performs the operation which corresponds to the operation of moving image coding apparatus 100.

In addition, one of the first reference picture list and the second reference picture list is reference picture list L0, and the other one is reference picture list L1. The first reference picture list may be any one of reference picture list L0 and reference picture list L1. Further, the second reference picture list may be any one of reference picture list L0 and reference picture list L1.

Furthermore, when only one reference picture is included in the reference picture list, index 0 is allocated to the one reference picture included in the reference picture list, so that an increase in an amount of code is suppressed.

Other Exemplary Embodiment

The first exemplary embodiment has been described above to exemplify a technique disclosed in this application. However, the technique according to the present disclosure is not limited to this, and is applicable to the first exemplary embodiment, too, for which changes, replacements, additions and omissions are optionally made. Further, each component described in the above first exemplary embodiment may be combined to provide new exemplary embodiments. Hence, the other exemplary embodiment will be exemplified below.

For example, in the first exemplary embodiment, coding unit 110 includes subtractor 111, converter 112, variable length coding unit 113, inverse converter 114, adder 115 and predicting unit 116. Further, decoding unit 210 includes variable length decoding unit 213, inverse converter 214, adder 215 and predicting unit 216. However, these components are exemplary components, and changes, replacements, additions and omissions may be optionally made.

Further, coding unit 110 may be expressed as an encoder, and decoding unit 210 may be expressed as a decoder. Storage units 120, 220 may be each expressed as a storage, a buffer, a memory, a reference picture buffer, a reference picture memory or the like.

Further, moving image coding apparatus 100 and moving image decoding apparatus 200 may selectively include a plurality of components according to the present disclosure, and a moving image coding method and a moving image decoding method may selectively include a plurality of types of processing according to the present disclosure.

Further, each component according to the present disclosure may be a circuit. These circuits may configure one circuit as a whole or may be different circuits, respectively. Further, these circuits may be general-purpose circuits or may be dedicated circuits, respectively.

Furthermore, each processing according to the present disclosure may be executed by a computer. For example, the computer executes each processing according to the present disclosure by executing a program by using hardware resources such as a processor (CPU), a memory and an input/output circuit. More specifically, the computer executes each processing by causing the processor to obtain processing target data from the memory or the input/output circuit and computing the data, or by outputting a computation result to the memory or the input/output circuit.

Further, the program for executing each processing according to the present disclosure may be recorded in a non-transitory recording medium such as a computer-readable CD-ROM. In this case, the computer executes each processing by reading the program from the non-transitory recording medium and executing the program.

Figure 7:
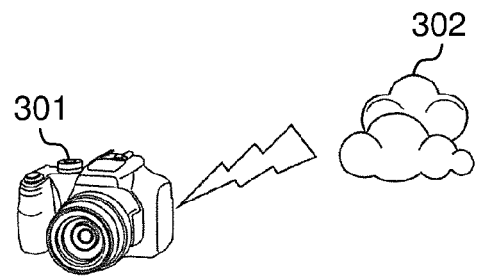
FIG. 7 is a conceptual diagram illustrating a first application example of the moving image coding apparatus according to the first exemplary embodiment.

Further, moving image coding apparatus 100 according to the first exemplary embodiment may be applied to various apparatuses. Application examples of moving image coding apparatus 100 will be described below with reference to FIGS. 7 to 9. FIG. 7 is a conceptual diagram illustrating a first application example of moving image coding apparatus 100 illustrated in FIG. 1. FIG. 7 illustrates digital camera 301 and cloud system 302. Digital camera 301 is an example of moving image coding apparatus 100. Digital camera 301 may include moving image coding apparatus 100.

Digital camera 301 codes a moving image according to a process described in the first exemplary embodiment. That is, digital camera 301 codes a coding target picture as a B picture by using a reference picture list including only one long-term reference picture ahead of a specific coding target picture in a display order, and a reference picture list including only one short-term reference picture ahead of the specific coding target picture in the display order. Further, digital camera 301 stores a coded moving image in cloud system 302 by transmitting the coded moving image to cloud system 302.

The process described in the first exemplary embodiment is applied to code moving images, so that an amount of code is reduced. Consequently, a data transmission amount of communication is also reduced, and a storage unit capacity for data storage is also reduced.

Figure 8:
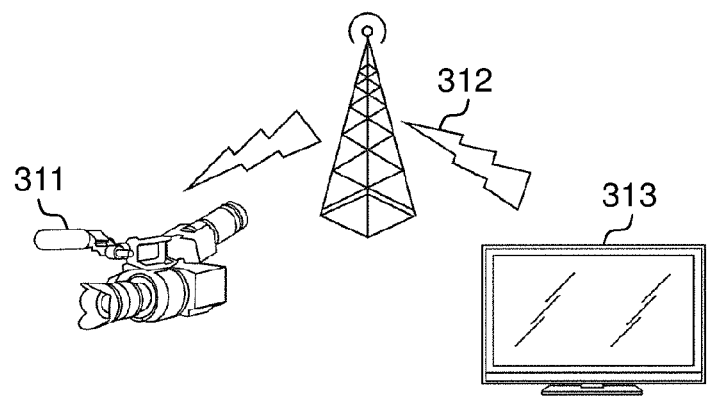
FIG. 8 is a conceptual diagram illustrating a second application example of the moving image coding apparatus according to the first exemplary embodiment.

FIG. 8 is a conceptual diagram illustrating a second application example of moving image coding apparatus 100 illustrated in FIG. 1. FIG. 8 illustrates broadcast camera 311, broadcast station 312 and television 313. Broadcast camera 311 is an example of moving image coding apparatus 100. Broadcast camera 311 may include moving image coding apparatus 100.

Broadcast camera 311 codes a moving image according to the process described in the first exemplary embodiment. That is, broadcast camera 311 codes a coding target picture as a B picture by using a reference picture list including only one long-term reference picture ahead of a specific coding target picture in a display order, and a reference picture list including only one short-term reference picture ahead of the specific coding target picture in the display order. Further, a coded moving image is transmitted from broadcast camera 311 to broadcast station 312, and is transmitted from broadcast station 312 to television 313.

The process described in the first exemplary embodiment is applied to code moving images, so that an amount of code is reduced. Consequently, a data transmission amount of broadcasting is also reduced.

Figure 9:
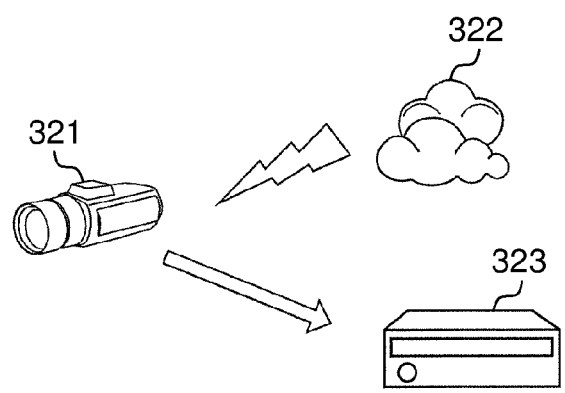
FIG. 9 is a conceptual diagram illustrating a third application example of the moving image coding apparatus according to the first exemplary embodiment.

FIG. 9 is a conceptual diagram illustrating a third application example of moving image coding apparatus 100 illustrated in FIG. 1. FIG. 9 illustrates monitoring camera 321, cloud system 322 and video recorder 323. Monitoring camera 321 is an example of moving image coding apparatus 100. Monitoring camera 321 may include moving image coding apparatus 100.

Monitoring camera 321 codes a moving image according to the process described in the first exemplary embodiment. That is, monitoring camera 321 codes a coding target picture as a B picture by using a reference picture list including only one long-term reference picture ahead of a specific coding target picture in a display order, and a reference picture list including only one short-term reference picture ahead of the specific coding target picture in the display order. Monitoring camera 321 stores a coded moving image in cloud system 322 or video recorder 323 by transmitting the coded moving image to cloud system 322 or video recorder 323.

The process described in the first exemplary embodiment is applied to code moving images, so that an amount of code is reduced. Consequently, a data transmission amount of communication is also reduced, and a storage capacity for data storage is also reduced. Further, a moving image coded by monitoring camera 321 basically includes a background image which does not change. Consequently, an effect obtained by applying the process described in the first exemplary embodiment is great.

The accompanying drawings and the detail description have been provided to describe the exemplary embodiments above as an exemplary technique of the present disclosure. Consequently, the components described in the accompanying drawings and the detailed description include not only components which are indispensable to solve the problem but also components which are not indispensable to solve the problem in order to exemplify the above technique. Hence, that the components which are not indispensable are described in the accompanying drawings and the detailed description should not be immediately acknowledged that these components which are not indispensable are indispensable.

Further, the above exemplary embodiments have been described to exemplify the technique according to the present disclosure. Consequently, various changes, replacements, additions and omissions can be made within the scope of the claims or a range equivalent to the scope of the claims.

The present disclosure is applicable to a moving image coding apparatus which codes moving images. More specifically, the present disclosure is applicable to digital video cameras, fixed-point observation cameras, monitoring cameras, and security cameras.

What is claimed is:

1. A moving image coding apparatus which codes a moving image, the moving image coding apparatus comprising:
a non-transitory memory in which a plurality of reference pictures and a program are stored; and
a hardware processor that executes the program and causes the moving imaging coding apparatus to operates as a coding unit which codes a plurality of coding target pictures,
wherein the coding unit codes, as a B picture, a specific coding target picture among the plurality of coding target pictures by using a first reference picture list and a second reference picture list,
the first reference picture list including only one reference picture ahead of the specific coding target picture among the plurality of reference pictures in a display order, wherein the one reference picture is a long-term reference picture, and
the second reference picture list including only one reference picture ahead of the specific coding target picture among the plurality of reference pictures in the display order, wherein the one reference picture is a short-term reference picture immediately before the specific coding target picture in the display order.

2. The moving image coding apparatus according to claim 1, wherein the one long-term reference picture is a reference picture ahead of the one short-term reference picture in the display order.

3. The moving image coding apparatus according to claim 1, wherein the one short-term reference picture is a last reference picture which comes immediately before the specific coding target picture in the display order.

4. The moving image coding apparatus according to claim 1, wherein the coding unit codes the one long-term reference picture with a larger amount of code than an amount of code of the one short-term reference picture.

5. The moving image coding apparatus according to claim 1, wherein, when the long-term reference picture is not included in the non-transitory memory, the coding unit codes the coding target picture as a P picture by using only the second reference picture list, or codes the coding target picture as an I picture without using the reference picture.

6. The moving image coding apparatus according to claim 1, wherein the coding unit codes each of a plurality of blocks of the specific coding target picture by referring to only one of the one long-term reference picture and the one short-term reference picture.

7. A moving image coding method for coding a moving image, the method comprising coding, as a B picture, a specific coding target picture among a plurality of coding target pictures by using a first reference picture list and a second reference picture list, the first reference picture list including only one reference picture ahead of the specific coding target picture among a plurality of reference pictures stored in a storage unit in a display order wherein the one reference picture is a long-term reference picture, and the second reference picture list including only one reference picture ahead of the specific coding target picture among the plurality of reference pictures in the display order wherein the one reference picture is a short-term reference picture immediately before the specific coding target picture in the display order.

8. A moving image coding apparatus which codes a moving image, the moving image coding apparatus comprising:

a non-transitory memory in which a plurality of reference pictures is stored; and a coding circuit which codes a plurality of coding target pictures, wherein the coding circuit codes, as a B picture, a specific coding target picture among the plurality of coding target pictures by using a first reference picture list and a second reference picture list, the first reference picture list including only one reference picture ahead of the specific coding target picture among the plurality of reference pictures in a display order wherein the one reference picture is a long-term reference picture, and the second reference picture list including only one reference picture ahead of the specific coding target picture among the plurality of reference pictures in the display order, wherein the one reference picture is a short-term reference picture immediately before the specific coding target picture in the display order.

9. The moving image coding apparatus according to claim 8, wherein the one long-term reference picture is a reference picture ahead of the one short-term reference picture in the display order.

10. The moving image coding apparatus according to claim 8, wherein the one short-term reference picture is a last reference picture which comes immediately before the specific coding target picture in the display order.

11. The moving image coding apparatus according to claim 8, wherein the coding circuit codes the one long-term reference picture with a larger amount of code than an amount of code of the one short-term reference picture.

12. The moving image coding apparatus according to claim 8, wherein, when the long-term reference picture is not included in the non-transitory memory, the coding unit codes the coding target picture as a P picture by using only the second reference picture list, or codes the coding target picture as an I picture without using the reference picture.

13. The moving image coding apparatus according to claim 8, wherein the coding circuit codes each of a plurality of blocks of the specific coding target picture by referring to only one of the one long-term reference picture and the one short-term reference picture.

* * * * *